(12) United States Patent
Driscoll et al.

(10) Patent No.: US 10,073,179 B2
(45) Date of Patent: Sep. 11, 2018

(54) SYSTEMS, METHODS AND DEVICES FOR SATELLITE NAVIGATION RECONCILIATION

(71) Applicant: Elwha LLC, Bellevue, WA (US)

(72) Inventors: Tom Driscoll, San Diego, CA (US); Joseph R. Guerci, Arlington, VA (US); Russell J. Hannigan, Sammamish, WA (US); Roderick A. Hyde, Redmond, WA (US); Muriel Y. Ishikawa, Livermore, CA (US); Jordin T. Kare, San Jose, CA (US); Nathan P. Myhrvold, Bellevue, WA (US); David R. Smith, Durham, NC (US); Clarence T. Tegreene, Mercer Island, WA (US); Yaroslav A. Urzhumov, Bellevue, WA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 653 days.

(21) Appl. No.: 14/667,402

(22) Filed: Mar. 24, 2015

(65) Prior Publication Data
US 2016/0282473 A1    Sep. 29, 2016

(51) Int. Cl.
*G01S 19/49* (2010.01)
*G01S 19/00* (2010.01)

(52) U.S. Cl.
CPC .................. *G01S 19/49* (2013.01)

(58) Field of Classification Search
CPC .......... G01S 19/49; G01S 19/20; G01S 19/21; G01S 19/23; G01S 5/14; G01S 19/215; H04K 3/22; H04B 7/18513
See application file for complete search history.

(56) References Cited

U.S. PATENT DOCUMENTS

| | | | |
|---|---|---|---|
| 5,946,603 A * | 8/1999 | Ibanez-Meier et al. ..................... H04B 7/18513 |
| 6,473,034 B2 * | 10/2002 | Lin et al. ............... G01S 19/215 |
| 7,064,706 B2 | 6/2006 | King et al. |
| 8,473,196 B2 | 6/2013 | Basnayake |
| 9,705,634 B2 * | 7/2017 | Lim ......................... H04K 3/22 |
| 2004/0128071 A1 * | 7/2004 | Schradi ..................... G01S 5/14 |
| 2004/0181495 A1 | 9/2004 | Grush |
| 2005/0096845 A1 | 5/2005 | Bergin et al. |
| 2007/0217555 A1 | 9/2007 | Beadle et al. |
| 2008/0238772 A1 | 10/2008 | Soloviev et al. |
| 2010/0079332 A1 | 4/2010 | Garin |
| 2010/0171659 A1 | 7/2010 | Waters et al. |
| 2012/0209519 A1 | 8/2012 | Basnayake |
| 2013/0285849 A1 | 10/2013 | Ben-Moshe et al. |
| 2014/0043188 A1 * | 2/2014 | Desai et al. ............ G01S 19/20 |

(Continued)

*Primary Examiner* — Bernarr E Gregory

(57) ABSTRACT

A three-dimensional map of an environment with buildings is used to computationally predict locations and times of global navigation satellite system (GNSS) transmission quality. A global navigation satellite system (GNSS) receiver can reconcile received satellite transmissions with these predicted satellite transmissions. By comparing actual transmission quality with predicted transmission quality, a system can determine unmodeled obstructions, temporary obstructions, jamming, spoofing or other origins of interference with predicted transmission quality of a satellite in a GNSS.

44 Claims, 11 Drawing Sheets

(56) References Cited

U.S. PATENT DOCUMENTS

2014/0266880 A1 9/2014 Farrokhi et al.
2015/0032370 A1 1/2015 Garin

* cited by examiner

SYSTEMS, METHODS AND DEVICES FOR SATELLITE NAVIGATION RECONCILIATION

If an Application Data Sheet ("ADS") has been filed on the filing date of this application, it is incorporated by reference herein. Any applications claimed on the ADS for priority under 35 U.S.C. § 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)).

PRIORITY APPLICATIONS

NONE

If the listings of applications provided herein are inconsistent with the listings provided via an ADS, it is the intent of the Applicants to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

The present disclosure relates to navigation systems and more specifically to modeling environments to reconcile detected satellite system behavior with predicted global navigation satellite system behavior.

DETAILED DESCRIPTION OF PREFERRED EMBODIMENTS

Figure 1:
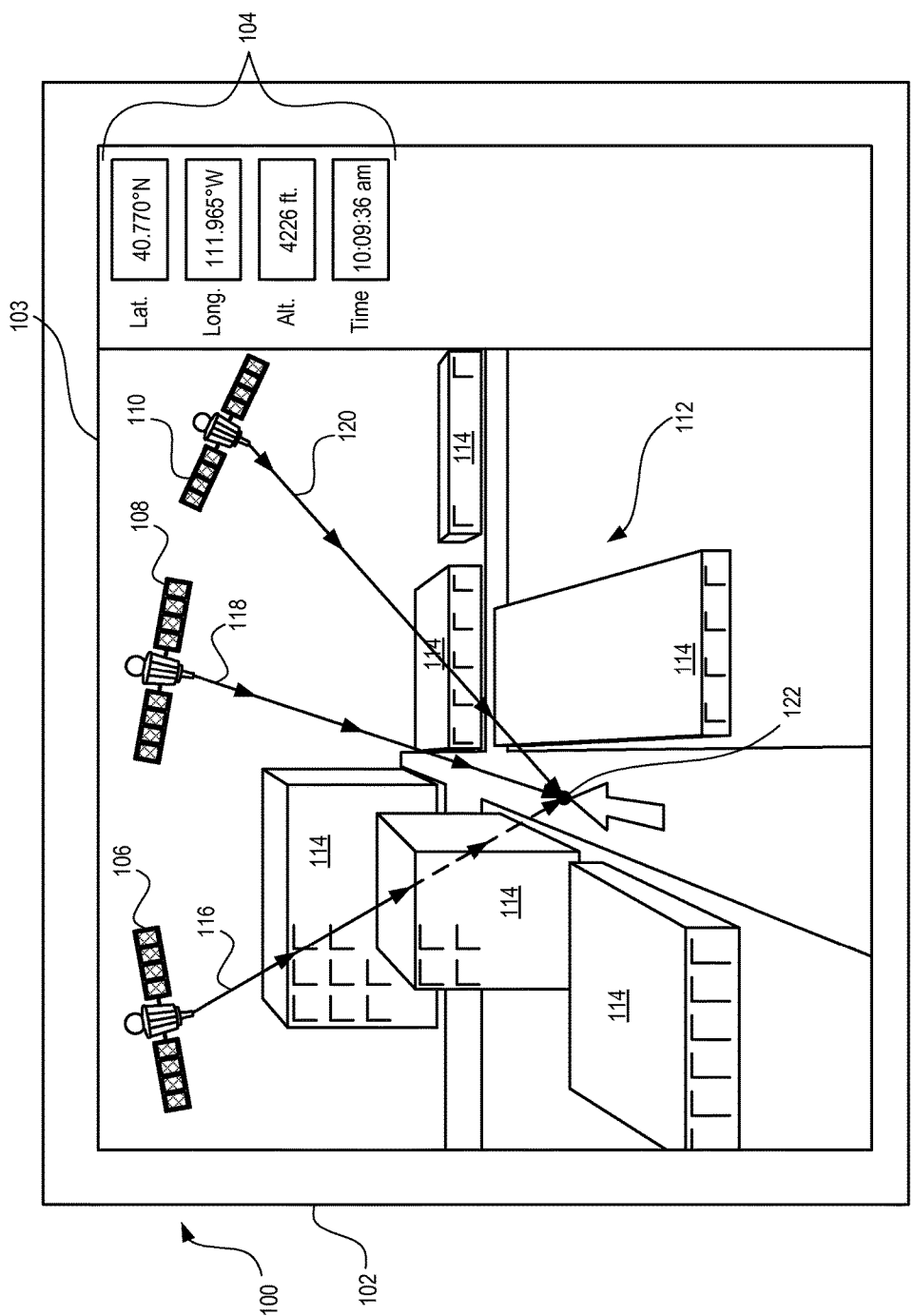
FIG. 1 is a diagram illustrating a global navigation satellite system (GNSS) modeling system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a global navigation satellite system (GNSS) receiver to reconcile received satellite transmissions with predicted satellite transmissions. By comparing actual transmission quality with predicted transmission quality, a system can determine unmodeled obstructions, temporary obstructions, jamming, spoofing or other origins of interference with predicted transmission quality of a satellite in a GNSS.

For example, a three-dimensional spatial map of an environment with buildings (or other man-made structures) can be used to computationally predict locations and times of GNSS blockages (e.g., low satellite transmission quality at a location). For example, in urban environments (e.g., New York City) some GNSS satellites are occluded by buildings. These blockages can be a predicable event. A computing system can make a map showing which satellites are or are not visible as a function both of location within the city and time (based at least in part on satellite orbits). This map can be made empirically (by actually measuring signals at different locations and times) or virtually (given a digital model of the city and knowledge of the orbits). Such maps can be made on a satellite-by-satellite basis, using a given satellite's behavior (as the behavior depends on time in orbit relative to Earth's rotation). The map can enable a mobile GNSS receiver to determine which satellites to use in a given situation. The computing system can determine when a given satellite will enter or leave a GNSS receiver view during a route (or a contiguous set of locations). The map can be stored in the GNSS receiver (or a host of the GNSS) or can be stored by a network service. This mapping can also be used to determine situations that include multi-path effects for a given satellite.

In some embodiments, a GNSS receiver can share data and correlate results. In an embodiment, unexpected obstructions to satellite transmissions (as seen by degraded transmission quality) are correlated. Using this correlation, an obstruction can be determined and added to a three-dimensional map. In one embodiment, temporary obstructions can be differentiated from permanent obstructions (such as by time of day of observations, etc.).

In some embodiments, a GNSS receiver or service can determine active interference with GNSS. A GNSS receiver can use simulation to determine inconsistencies with simulated results that can indicate external actions such as spoofing, jamming or other active measures to interfere with GNSS operation. In an embodiment, a GNSS receiver determines that a result of a simulation indicates that a satellite transmission has a low predicted transmission quality. A received transmission with a higher transmission quality can indicate spoofing. In another embodiment, a simulation indicates that a satellite transmission has a high predicted transmission quality. A low transmission quality can indicate jamming. In one embodiment, a higher than expected background noise indicates jamming.

A GNSS can include global satellite systems, regional satellite systems and enhanced systems. Satellite systems include the global positioning system (GPS), GLONASS, Beidou navigation satellite system (BDS), Galileo, doppler orbitography and radio-positioning integrated by satellite (DORIS), Indian regional navigational satellite system (IRNSS) and quasi-zenith satellite system (QZSS). Enhanced systems include wide area augmentation system (WAAS), European geostationary navigation overlay service (EGNOS), multi-functional satellite augmentation system (MSAS), GPS-aided geo-augmented navigation (GAGAN), StarFire, assisted GPS (A-GPS or aGPS) and differential GPS (DGPS).

In one embodiment, a satellite visibility system can include storage that holds a three-dimensional spatial map that includes buildings. Using satellite ephemeris data and a position within the map at a time, a satellite signal transmission can be simulated from the satellite to the position at the time within the map. A transmission quality of the transmission can be estimated based on the simulation. In some embodiments, multiple satellites can be simulated. In other embodiments, satellite transmissions can be modeled over time (such as at a fixed location, or over a route) taking into account satellite motion, Earth rotation, and user motion.

In an embodiment, a navigation system can predict transmission qualities of satellite signals over time in an urban environment that includes buildings. The transmission qualities can be simulated over time to predict if or when the transmission qualities will degrade below a quality threshold. When too few satellite signals are above a transmission quality threshold, a navigation position can be difficult to determine and/or unreliable (also known as an outage). The transmission qualities can also be simulated over time to predict a duration of an outage. When the transmission qualities are predicted to degrade below a quality threshold and/or for a threshold period of time, the navigation system can be configured to use a backup navigation subsystem with less or zero reliance on the satellites (e.g., inertial navigation, assisted global positioning system (A-GPS), differential global positioning system (DGPS), etc.).

In some embodiments, a navigation system can use the predicted transmission quality from simulated transmissions in the three-dimensional maps to determine positional quality estimates. In one embodiment, a navigation system can determine multi-path effects (such as time spread) during the simulation of transmissions of the three-dimensional environment using buildings. Simulations can also include estimates that include building materials and numbers of satellites. In an embodiment, a positional quality estimate can be represented by a shape that forms a contour (e.g., circle or ellipse) of uncertainty of the current position. As the positional quality degrades, the size of the shape increases, showing a greater uncertainty of the position. In one embodiment, a positional quality can be estimated over time, including a duration of a positional quality below a positional quality threshold.

In some embodiments, a GNSS receiver can be network-connected. In an embodiment, a GNSS receiver can be connected to a local, regional and/or global network. In one embodiment, a GNSS receiver can be connected with a network service that provides navigation support (such as three-dimensional maps, satellite data, warm start information, satellite maps, time dependent service coverage maps or other navigation and/or simulation information). In another embodiment, the GNSS receiver can be connected with other GNSS receivers through the network. In an embodiment, GNSS receivers share information, such as updated maps, unexpected blockages, or other measurements, predictions, estimates and/or data.

In some embodiments, a network service can provide some or all of the simulation processing results and/or navigation data to a connected GNSS receiver. In several embodiments, the GNSS receiver offloads processing to a network service. In one embodiment, a GNSS receiver provides a position and time to a network service and receives data describing predicted transmission qualities of satellites. In another embodiment, a GNSS receiver provides a route to a network service and receives predicted outage information. In one embodiment, a GNSS receiver provides a current position to a network service and receives a set of updates on simulated transmission qualities of satellites along a route estimated by the network service. In other embodiments, a GNSS receiver receives updated information from a network service. In an embodiment, a GNSS receiver receives updated three-dimensional maps from the network service.

In one embodiment, a GNSS receiver can communicate with other GNSS receivers in a peer-to-peer fashion. In one embodiment, the peer-to-peer connections are over a wide-area network (such as the Internet). In another embodiment, the peer-to-peer connections are over a local network connection (such as a device-to-device connection). In some embodiments, the GNSS receivers share data, such as transmission quality history, updated maps, inconsistencies between measured and predicted information, blockage information, etc. In an embodiment, local GNSS receivers share computing resources (such as splitting up computing tasks, computing positions, detecting satellite ephemeris data, or simulating satellite positions) by computing in parallel and sharing results.

In some GNSS systems (such as GPS) a satellite transmission includes a pseudorandom code, satellite ephemeris data and almanac data. The pseudorandom code identifies a satellite from which the transmission originates. The satellite ephemeris data can include information about satellite location (current and/or predicted), timing and satellite health. Almanac data can describe coarse orbital parameters of the satellite and other satellites in the GNSS.

In one embodiment, a GNSS receiver uses trilateration to determine latitude, longitude and altitude. By aligning an internal clock with received transmissions from satellites (taking into account delays in receipt), a GNSS receiver can determine a distance away from a satellite based on a delay of transmission to receipt. By combining these distance measurements with satellite ephemeris data, a GNSS receiver can determine its position. Using historical information, a GNSS receiver can also determine speed, direction, acceleration and other position-based information. Based on signals from three satellites, a GNSS receiver can estimate latitude and longitude using trilateration and an assumption of the Earth as a sphere. Based on signals from four or more satellites, a GNSS receiver can estimate latitude, longitude and altitude.

By using a three-dimensional map to estimate transmission quality of satellite transmissions to a GNSS receiver, decisions can be made based on GNSS navigation quality (such as number of satellites having transmission quality above a transmission quality threshold, expected duration of a threshold number of satellites having transmission quality above a transmission quality threshold, expected duration of satellites having transmission quality below a transmission quality threshold, etc.).

GNSS based systems can also be used to enable location-based services besides route guidance. Location based services can include routing, fleet services, medical services and directed advertising. In one embodiment, GNSS services can be used to predict location based services quality (which can include Internet connectivity quality). For example, a GPS receiver can use aGPS information (e.g., cellular towers, wireless local area network (WLAN or Wi-Fi™) signals) to predict location determination time (e.g. GPS "lock-on" time) as well as cellular signal strength. In another embodiment, WLAN signals are used to supplement low quality GNSS signals and aid in prediction of a location indoors through use of a database of WLAN access point locations. In another embodiment, a hybrid GPS system is used which can use GPS signals, cell tower signals, wireless internet signals, Bluetooth™ sensors, IP addresses and/or network environment data.

GNSS based systems can also be used to predict location-based-service quality and/or compare predicted location-based-service quality between routes. Simulations of GNSS systems can include supplemental simulations or information in the three-dimensional map, such as cell towers and reference sites. For example, a GPS system can use aGPS information (cellular towers, etc.) and/or DGPS information (reference sites, etc.) in its simulation to predict location-based-service quality. As satellite signals transmission quality changes in spacetime in simulation, the aGPS and/or DGPS behavior can be simulated in spacetime to determine effects on location-based-service quality. The simulating system can recommend a route based on the predicted location-based-service quality. In some embodiments, the predicted location-based-service quality is Internet service quality.

In one embodiment, routing information is delivered to a robotic vehicle. The vehicle can be dependent on a data link which includes a link with a GNSS service to provide routing information. The GNSS service can provide rating on routes based at least in part on efficacy for location-based services (including location-based cellular services, etc.). The route can then be delivered to the robotic vehicle over the data link.

FIG. 1 is a diagram 100 of a GNSS modeling system 102 that uses a three-dimensional map 112 containing buildings 114 with satellite ephemeris data to predict GNSS coverage of a spacetime location 122. The GNSS modeling system 102 can create a model 103 of an environment using a three-dimensional map 112 (such as those created by light detection and ranging (LIDAR) or other methods). Using attributes 104 of the predicted spacetime location 122 (such as latitude, longitude, altitude and time) and satellite ephemeris data, satellite transmission quality can be predicted.

In the embodiment shown, satellites 106, 108 and 110 are modeled to provide transmissions 116, 118 and 120 to the spacetime location 122. Transmissions 118 and 120 are predicted to have a high transmission quality (shown by solid lines), while transmission 116 is predicted to be blocked by a building 114 and become a low quality transmission (shown by the dashed line).

In some embodiments, the GNSS modeling system 102 can include other modeling techniques. For example, a line of sight from the spacetime location 122 and a satellite is modeled to be a high quality transmission. The GNSS can also model non-line of sight situations, which provide a degraded quality transmission (such as blocking by a building or the Earth). The GNSS modeling system 102 can use construction material (composition data) to determine reflection, refraction, transmittance and/or absorption of signal transmissions from the satellites 106, 108 and 110. In another example, the GNSS modeling system 102 can estimate multi-path effects from reflections in between buildings 114 (such as delay and/or frequency spread). These models can aid in determining an uncertainty in predicted navigation position determination.

In some embodiments, a navigation quality can be determined using the model 103. In some embodiments, if a minimum number of satellites 106, 108 and 110 having a predicted transmission quality that exceeds a transmission quality threshold is not met, then a navigation quality can be predicted to be degraded. When a navigation quality is sufficiently degraded, it is called an outage. In some embodiments, a minimum of four satellites with a transmission quality that exceeds a transmission threshold is needed to provide accurate latitude, longitude and altitude estimates. In an embodiment, a minimum of three satellites with a transmission quality that exceeds a transmission threshold is needed to provide accurate latitude and longitude estimates.

In some embodiments, predictions are on a per-satellite basis. For a given spacetime location, the model indicates which satellites have a clear line of sight. The model can indicate how many and which satellites a given spacetime location should be able to access. In some embodiments, this information is used to determine when and where a GNSS system will have insufficient (such as less than four) satellites in view. In some embodiments, this information is used to determine which satellites a GNSS receiver should attempt to access. In some embodiments, this information is used to determine the effect which transmissions from specific satellites will have on location accuracy provided by a GNSS receiver at a spacetime location, and can be used to determine not only which satellites the GNSS receiver should attempt to access, but also their relative priority and/or the order in which they should be accessed.

In addition to blockage information, a three-dimensional map can be used to predict multipath effects in some embodiments. The predictions can include a time spread for each satellite's signals at a given spacetime location, a strength of reflected signals and a frequency spread. This prediction can be computed whether or not the satellite line of sight is blocked. This prediction (or predictions) can be used to determine where alternative navigation systems (such as AGPS) are needed. In some embodiments, spatial locations that suffer frequent blockages can be selected as prime candidates for alternative navigation systems.

Figure 2:
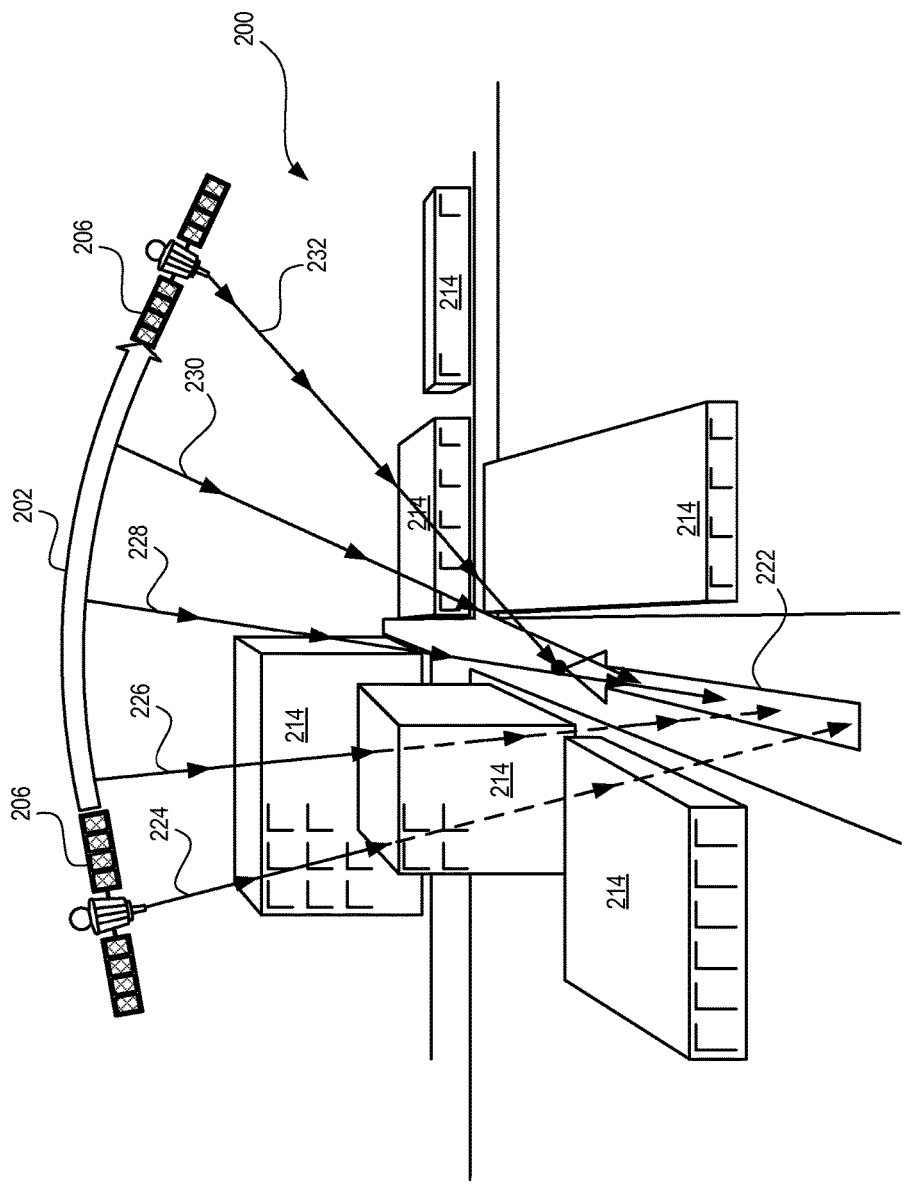
FIG. 2 is a diagram illustrating GNSS modeling consistent with embodiments disclosed herein.

FIG. 2 is a diagram 200 illustrating GNSS modeling. In some embodiments, a GNSS modeling system can create a time dependent coverage map 212. In the embodiment shown, a GNSS receiver can apply the time dependent coverage map 212 to a route 222. Based on the time dependent coverage map 212, transmissions 224 and 226 will be obstructed by a building 214 during the route 222. Transmissions 228, 230 and 232 will have line of sight and are predicted to have a high transmission quality along the route 222.

A time dependent coverage map 212 can be obtained by different sources. In one embodiment, a central service computes the time dependent coverage map 212. The central service can then provide the map and/or updates to the map through a network (such as a wireless network (e.g., cellular, wireless local area network (WLAN), personal area network (PAN), etc.)) to the GNSS system. In some embodiments, the service provides an application programming interface (API) to allow GNSS receivers to request the time dependent coverage map 212. In other embodiments, the service can provide a push message to provide the time dependent coverage map 212. In another embodiment, a GNSS receiver calculates the time dependent coverage map 212 itself. In yet another embodiment, GNSS receivers can share time dependent coverage maps through peer networking. In one embodiment, GNSS receivers share processing resources and compute a time dependent coverage map 212 in parallel.

In some embodiments, satellite transmission quality predictions can be made for travel along a route. These transmission quality predictions can include a determination of which satellites are predicted to be available at any spacetime location along the route. The predictions can include when and/or where a single satellite, or full GNSS, outage will occur along a route and for how long given travel along the route. For example, if a satellite "k" is currently obstructed, the GNSS modeling system can tell when it will become available and for how long. If satellite k is currently available, the GNSS modeling system can tell when it will become obstructed.

The time dependent coverage map 212 can be based on a three-dimensional map and satellite ephemeris data. Satellite ephemeris data can include information about a satellite 206 and a constellation of satellites. For example, satellite ephemeris data from the satellite 206 can indicate that the satellite 206 moves along a trajectory 202.

In some embodiments, predictions as to length of outages and number of satellites involved can be used to decide how to deal with an outage. If satellite k is predicted to be visible for a short period, the navigation system can decide not to attempt to use it. If an outage (along the route) is short, the navigation system can decide to rely on inertial backup. If the outage is predicted to last longer, the navigation system can engage alternative navigation systems (e.g., inertial systems, augmented systems such as AGPS systems, etc.). In one embodiment, a decision as to which type of alternative system to use during an outage can depend on how many satellites are still available (and their directions).

In addition to computational predictions based on a three-dimensional map of the environment, the predictions can include empirically measured blockage information from GPS receivers at various spacetime locations. These measurements can come from a local receiver or from other receivers (e.g., peer-to-peer, or report to a service). These measurements may be used to infer locations of obstructions.

The predictions can be made into a time dependent coverage map, allowing users to get coverage information for any desired spacetime location. The coverage map can be made on board each GPS receiver, using either an on-board or service-based three-dimensional map of the environment. In an embodiment, a coverage map can be provided by an off-board entity which supplies the information to GNSS receivers.

In some embodiments, the predictions can be used to diagnose coverage issues. A low signal level for satellite k at a location where coverage should exist can indicate an unmodeled obstruction. If a locus of blockages of lines of sight converges, a fixed obstruction can be inferred from the blockages, allowing the fixed obstruction to be added to the three-dimensional map. If the lines-of-sight blockages do not converge, this result can indicate a temporary obstruction (e.g., from a nearby vehicle).

Figure 3:
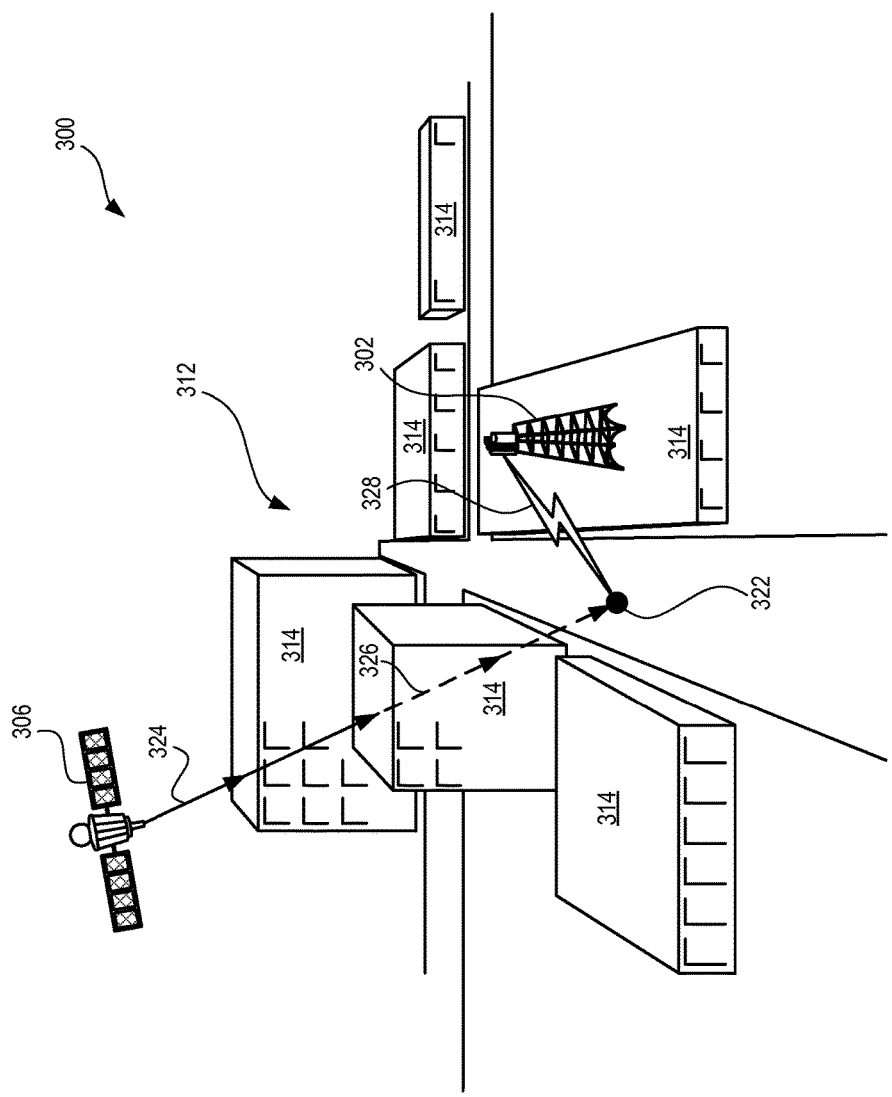
FIG. 3 is a diagram of an environment with satellite transmission spoofing consistent with embodiments disclosed herein.
Figure 4:
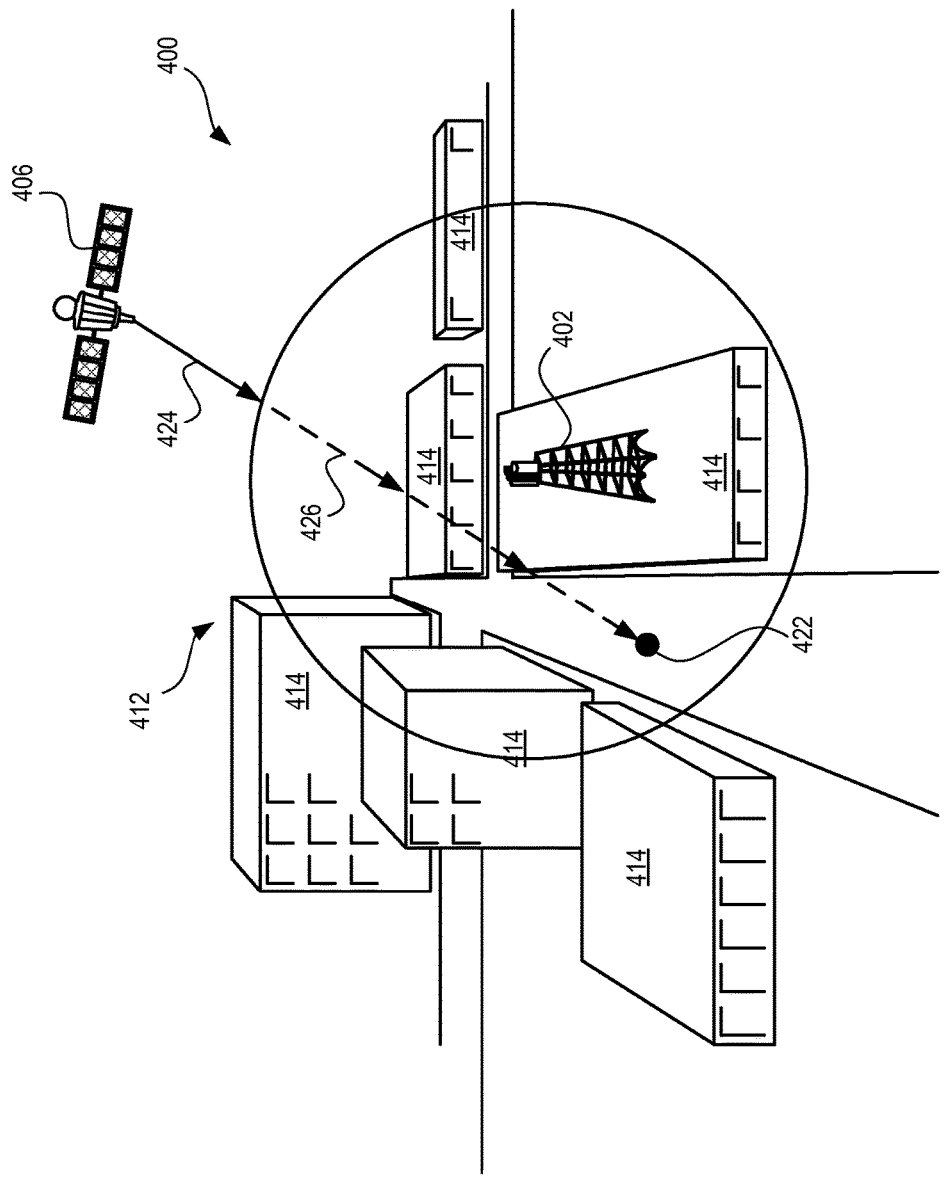
FIG. 4 is a diagram of an environment with satellite transmission jamming consistent with embodiments disclosed herein.

An application of the modeling system is used in some embodiments, shown in FIGS. 3 and 4, to identify spoofing or jamming. If the modeling system predicts, using the map, that satellite k has a low transmission quality at the time/location, then a "signal" from the satellite represents a spoofing attempt. If the modeling system predicts, using the map, that satellite k has a high transmission quality at the time/location, then a low transmission quality due to high noise represents a jamming event, whereas a low transmission quality due to low signal strength represents a blockage event.

FIG. 3 is a diagram of an environment 300 with satellite transmission spoofing. In the embodiment shown, a modeling system predicts, using a four-dimensional spacetime map 312 (i.e., a time-dependent three-dimensional spatial map), that a predicted transmission 324 from a satellite 306 is obstructed by a building 314 to form a predicted degraded transmission 326 having a low transmission quality to a position 322. However, a GNSS receiver at the position 322 receives a measured transmission 328 of high transmission quality that appears to be from the satellite 306, but is from a spoofing system 302. A GNSS receiver can determine that a spoofing attempt is occurring due to the difference between a predicted transmission quality of the predicted degraded transmission 326 having a low transmission quality and the measured transmission 328 having a high transmission quality. For example, an apparently valid serial number (S/N) for satellite k at a location where coverage is predicted to not exist can indicate a spoofing attempt.

FIG. 4 is a diagram of an environment 400 with satellite transmission jamming. In the embodiment shown, a modeling system predicts, using a four-dimensional spacetime map 412, that a predicted transmission 424 from a satellite 406 will have a high transmission quality to a location 422 due to line of sight between the satellite 406 and the location 422. However, a GNSS receiver at the position 322 receives a measured degraded transmission 426 having a low transmission quality to the location 422 due to the jamming by a jamming system 402. A GNSS receiver can determine that at least one of an unmodeled blockage or a jamming attempt is occurring due to the difference between a predicted transmission quality of the predicted transmission 424 having a high transmission quality and the measured transmission having a low transmission quality. In addition, a high noise level can further indicate jamming rather than blockage. For example, a high noise level for a satellite k at a location where coverage should exist can indicate jamming.

Figure 5:
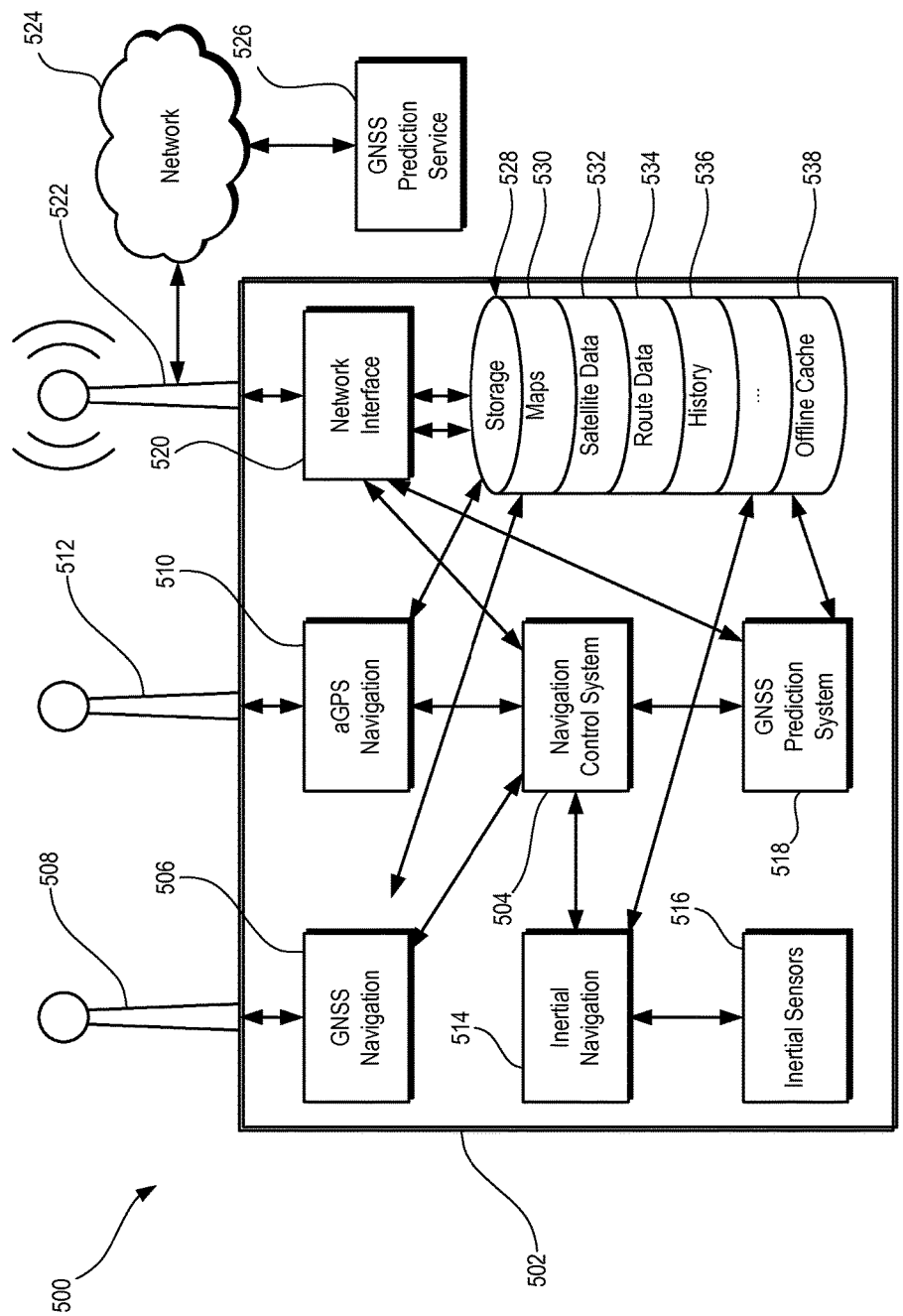
FIG. 5 is a diagram of a GNSS receiver consistent with embodiments disclosed herein.

FIG. 5 is a diagram 500 of a navigation system 502 that includes a GNSS receiver 506. The navigation system 502 can include a navigation control system 504, the GNSS navigation subsystem 506, an augmented GNSS system (such as an aGPS navigation system 510), a secondary navigation subsystem (such as inertial navigation system 514), a network interface 520 and storage 528. The navigation system 502 can determine which navigation subsystem to select based on predicted effectiveness. The predicted effectiveness can be computed by the navigation control system 504 and/or received through a network interface from a network service 526. For example, when a GNSS navigation subsystem 506 is predicted to be less effective, an augmented GNSS system (such as the aGPS navigation system 510) or an inertial navigation system 514 can be selected for use.

Depending on the embodiment, a GNSS modeling system can be incorporated into the receiver or a GNSS service. In some embodiments, the navigation control system 504 can predict satellite transmission qualities to a position at a time using a GNSS prediction system 518. The navigation control system 504 can retrieve information from storage 528 and model satellite transmissions to a location at a time as described above (e.g., in conjunction with FIGS. 1 and 2). For example, the navigation control system 504 can retrieve a three-dimensional map from map storage 530 and satellite ephemeris data from satellite data storage 532 (and/or from satellite signals received through the GNSS receiver 506). Using determined route data (which can be retrieved from route data storage 534 or predicted based on position history retrieved from history storage 536), the navigation control system 504 can model satellite transmissions in the three-dimensional maps to an expected spacetime location of the navigation system 502 using the GNSS receiver 506. This predicted data can be used to determine whether to rely on the GNSS receiver 506, engage augmented systems (such as the aGPS system 510 with a GPS antenna 512) or use alternate navigation systems (such as the inertial navigation system 514 with inertial sensors 516).

In some embodiments, the navigation control system 504 can communicate with the network service 526 over the network interface 520 (connected to an antenna 522) to receive information for predicting satellite transmission qualities. The navigation control system 504 can perform all or some computations locally or rely on the network service 526 to receive data (e.g., three-dimensional maps, ephemeris data, coverage maps, time dependent coverage maps, predicted transmission quality data, etc.). For example and in one embodiment, the navigation control system 504 receives an updated three-dimensional map from the network service 526 over a wireless network 524 (such as a cellular network, WLAN, PAN, etc.). The navigation control system 504 can store the updated map in map storage 530 and use it in future modeling of satellite transmissions. In some embodiments, the navigation control system 504 can use an offline cache 538 to store data for when communication with the network service 526 is unavailable.

In another embodiment, the network service simulates a model of satellites over time and provides a time dependent map to the navigation control system 504. The navigation control system 504 can then use the predicted coverage map to make decisions regarding navigation (such as relying on a GNSS receiver, using alternate navigation, waiting for an outage to pass, estimating position based on historical data and/or predicted data, etc.).

In an embodiment, the network service simulates a model of satellites over time in a three-dimensional map with buildings and provides a predicted satellite transmission quality at a spacetime position. The model can simulate a transmission of satellite navigation signals from a set of satellites to a set of locations. The simulation can be requested by the navigation control system 504 through an API of the network service 526. The simulation can be performed by the network service 526 and reported to the navigation control system 504 based on prior requests and a predicted route with timing.

In another embodiment, the navigation control system 504 can provide GNSS receiver data to the navigation service 526 and receive results. For example, the navigation control system 504 can provide the received transmission data to the network service 526. The network service 526 can compare the measured data (signal strength, timing, noise, the receiver's derived position estimate, etc.) to predicted data (signal strength, timing, noise, a position estimate predicted from satellite data and a three-dimensional map, etc.). The network service 526 can then report the predicted position, anomalies (such as jamming or spoofing) and/or suggested recommendations for navigation. Recommendations for navigation can be based on predictions of outages, determined spoofing or jamming, and/or measured satellite transmission qualities. The network service 526 can also correlate multiple reports of unexpected low transmission qualities to determine temporary or permanent unmodeled obstructions.

In some embodiments, the navigation control system 504 can communicate with the GNSS receiver 506 to compare received GNSS signals (over an antenna 508) to predicted GNSS signals. The navigation control system 504 can use these anomalies to determine unmodeled obstructions, spoofing or jamming, and/or to make decisions on navigation.

Figure 6:
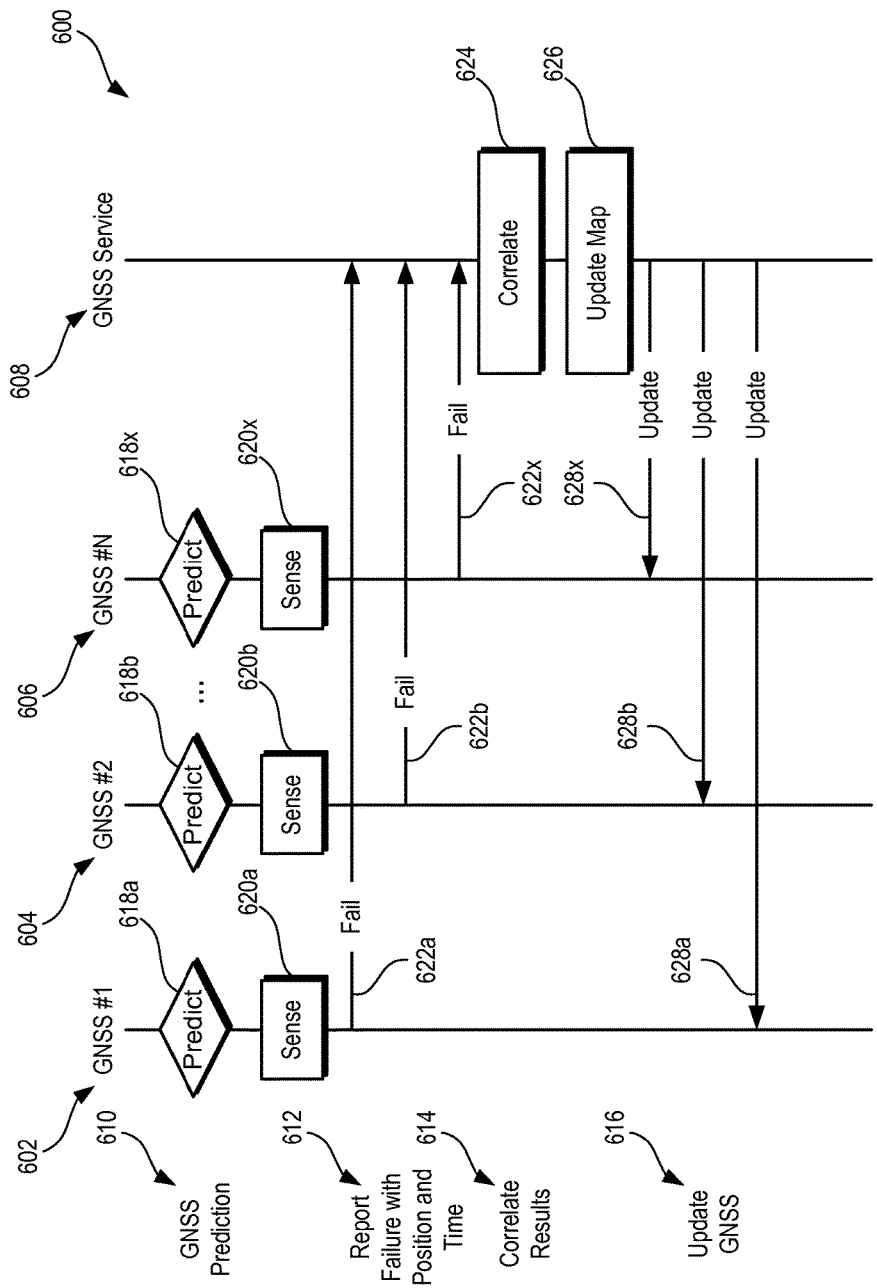
FIG. 6 is a process diagram of a set of GNSS receivers interacting with a GNSS service consistent with embodiments disclosed herein.
Figure 7:
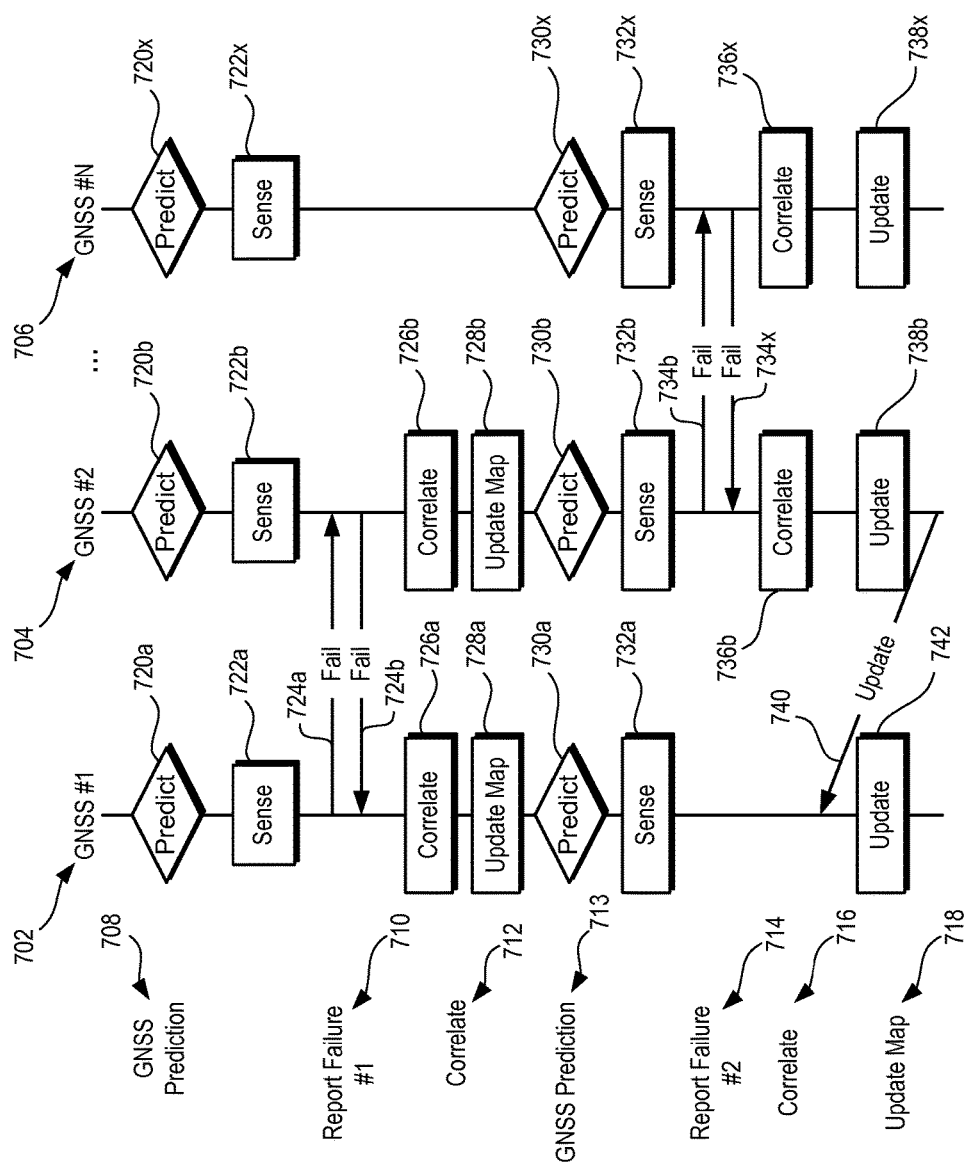
FIG. 7 is a process diagram of a set of GNSS receivers interacting in a peer-to-peer configuration consistent with embodiments disclosed herein.

FIGS. 6 and 7 describe processes in which data from multiple GNSS receivers can be correlated to determine new information about the environment which can be shared among the GNSS receivers. In FIG. 6, this correlation and processing can be performed by a central service. In FIG. 7, the correlation and processing can be performed in a peer-to-peer environment.

FIG. 6 is a process diagram 600 of a set of GNSS receivers interacting with a GNSS service. The process can be accomplished by a system such as the one shown in FIG. 5 including a plurality of navigation systems 502 and the network service 526. The process involves a plurality of GNSS navigation systems 602, 604 and 606. The process includes the GNSS navigation systems 602, 604 and 606 predicting satellite transmission qualities in operation 610. The GNSS navigation systems 602, 604 and 606 report to a GNSS service 608 a failure of the prediction to match measured transmission qualities in operation 612 at a position and time. The GNSS service 608 correlates the results in operation 614. The GNSS service then, at operation 616, sends updated obstruction information (such as a three-dimensional map with an obstruction removed or added) to GNSS navigation systems 602, 604 and 606.

For example, GNSS navigation system #1 (602), predicts a satellite transmission quality using a three-dimensional map and satellite ephemeris data in block 618*a*. GNSS navigation system #2 (604), predicts a satellite transmission quality using a three-dimensional map and satellite ephemeris data in block 618*b*. This repeats with a plurality of GNSS navigation systems up to N systems, including GNSS navigation system #N (606) which predicts a satellite transmission quality using a three-dimensional map and satellite ephemeris data in block 618*x*. The GNSS navigation systems 602, 604 and 606 then perform a sensing of transmission quality in blocks 620*a*, 620*b* and 620*x* that matches the prior prediction in blocks 618*a*, 618*b* and 618*x*. At least some of the predictions do not match the measured satellite transmission quality. These failures are reported to the GNSS service 608. GNSS navigation system #1 (602)

reports the failure to match in operation 622a. GNSS navigation system #2 (604) reports the failure to match in operation 622b. GNSS navigation system #N (606) reports the failure to match in operation 622x. The GNSS service 608 correlates reports in block 624 until the correlation converges (e.g., a previously unknown obstruction is identified or a previously known obstruction is removed) in block 626. The GNSS service 608 then sends an update (such as an updated three-dimensional map, an updated coverage map, etc.) to the GNSS navigation systems 602, 604 and 606 in operation 616. The GNSS navigation system #1 (602) receives a transmission from the GNSS service 608 in operation 628a. The GNSS navigation system #2 (604) receives a transmission from the GNSS service 608 in operation 628b. This continues to include the GNSS navigation system #N (606) receiving a transmission from the GNSS service 608 in operation 628x.

FIG. 7 is a process diagram of a set of GNSS receivers interacting in a peer-to-peer configuration. The process can be accomplished by a system such as shown in FIG. 5 including a plurality of navigation systems 502. The process involves a plurality of GNSS navigation systems 702, 704 and 706. The process shows an example when GNSS navigation system #1 (702) begins in peer-to-peer network communication range of GNSS navigation system #2 (704) during operation 710, moves out of range during operation 714 and then back in range for operation 718. GNSS navigation system #2 (704) begins out of peer-to-peer network communication range of GNSS navigation system #N (706) during operation 710, moves in range during operation 714 and then back out of range for operation 718.

The GNSS navigation systems 702, 704 and 706 perform a prediction in operation 708. The GNSS navigation systems 702, 704, while within communication range, share information wherein predictions of satellite transmission qualities did not match measured satellite transmission qualities, in operation 710. The GNSS navigation systems 702, 704 perform correlation of the shared data in operation 712 in an attempt to discover unknown obstructions or remove obstructions from three-dimensional maps. The GNSS navigation systems 702, 704 and 706 perform another prediction in operation 713. The GNSS navigation systems 704, 706, while within communication range, share information wherein predictions of satellite transmission qualities did not match measured satellite transmission qualities, in operation 714. The GNSS navigation systems 704, 706 perform correlation of the shared data in operation 716 in an attempt to discover unknown obstructions or remove obstructions from three-dimensional maps. Updated three-dimensional maps can be shared with GNSS navigation systems 702, 704 and 706 in operation 718.

For example, the GNSS navigation systems 702, 704 and 706 determine predicted satellite transmission qualities in operation 708. GNSS navigation system #1 (702) predicts transmission qualities from satellites in block 720a. GNSS navigation system #2 (704) predicts transmission qualities from satellites in block 720b. GNSS navigation system #N (706) predicts transmission qualities from satellites in block 720x. The GNSS navigation systems 702, 704 and 706 then sense measured satellite transmission qualities in blocks 722a, 722b and 722x respectively. Significant deviations between predicted satellite transmission quality and measured transmission quality can be shared between the GNSS navigation systems 702 and 704 when they are in peer-to-peer network range in operation 710. GNSS navigation system #1 (702) reports deviations to GNSS navigation system #2 (704) in transmission 724a. GNSS navigation system #2 (704) reports deviations to GNSS navigation system #1 (702) in transmission 724b. The GNSS navigation systems 702 and 704 then perform a correlation operation 712. GNSS navigation system #1 (702) performs a correlation operation in block 726a and updates an internal map with discovered information (such as potential new obstructions or potential obstructions that are no longer present) in block 728a. GNSS navigation system #2 (704) performs a correlation operation in block 726b and updates an internal map with discovered information (such as potential new obstructions or potential obstructions that are no longer present) in block 728b.

The prediction operations, report operations and correlation operations can repeat until it is determined that a new obstruction is present or a previous obstruction is no longer present on a three-dimensional map that includes buildings. In the example shown, the GNSS navigation systems 702, 704 and 706 determine predicted satellite transmission qualities in operation 713. GNSS navigation system #1 (702) predicts transmission qualities from satellites in block 730a. GNSS navigation system #2 (704) predicts transmission qualities from satellites in block 730b. GNSS navigation system #N (706) predicts transmission qualities from satellites in block 730x. The GNSS navigation systems 702, 704 and 706 then sense measured satellite transmission qualities in blocks 732a, 732b and 732x respectively. Significant deviations between predicted satellite transmission quality and measured transmission quality can be shared between GNSS navigation systems 704 and 706 when they are in peer-to-peer network range in operation 714. GNSS navigation system #2 (704) reports deviations to GNSS navigation system #N (706) in transmission 734b. GNSS navigation system #N (706) reports deviations to GNSS navigation system #2 (704) in transmission 734x. The GNSS navigation systems 704 and 706 then perform a correlation operation 716. GNSS navigation system #2 (704) performs a correlation operation in block 736b and updates an internal map with discovered information (such as potential new obstructions or potential obstructions that are no longer present) in block 738b. GNSS navigation system #N (706) performs a correlation operation in block 736x and updates an internal map with discovered information (such as potential new obstructions or potential obstructions that are no longer present) in block 738x.

Due to the correlation operation 736b performed by GNSS navigation system #2 (704), an obstruction was discovered and added to the three-dimensional map in block 738b. This updated map can be shared via a network connection (shown here as a peer-to-peer connection, but other connections are also possible, e.g., network service, repository, WLAN, PAN, etc.) as shown in operation 718. In the embodiment shown, GNSS navigation system #2 (704) transmits the updated three-dimensional map to GNSS navigation system #1 (702) in transmission 740. GNSS navigation system #1 (702) then updates its map with the new information in block 742. Depending on the embodiment, the update can be information describing the change to the three-dimensional map (e.g., an addition), or an update to a portion of a three-dimensional map, or an update of the entire three-dimensional map.

Figure 8:
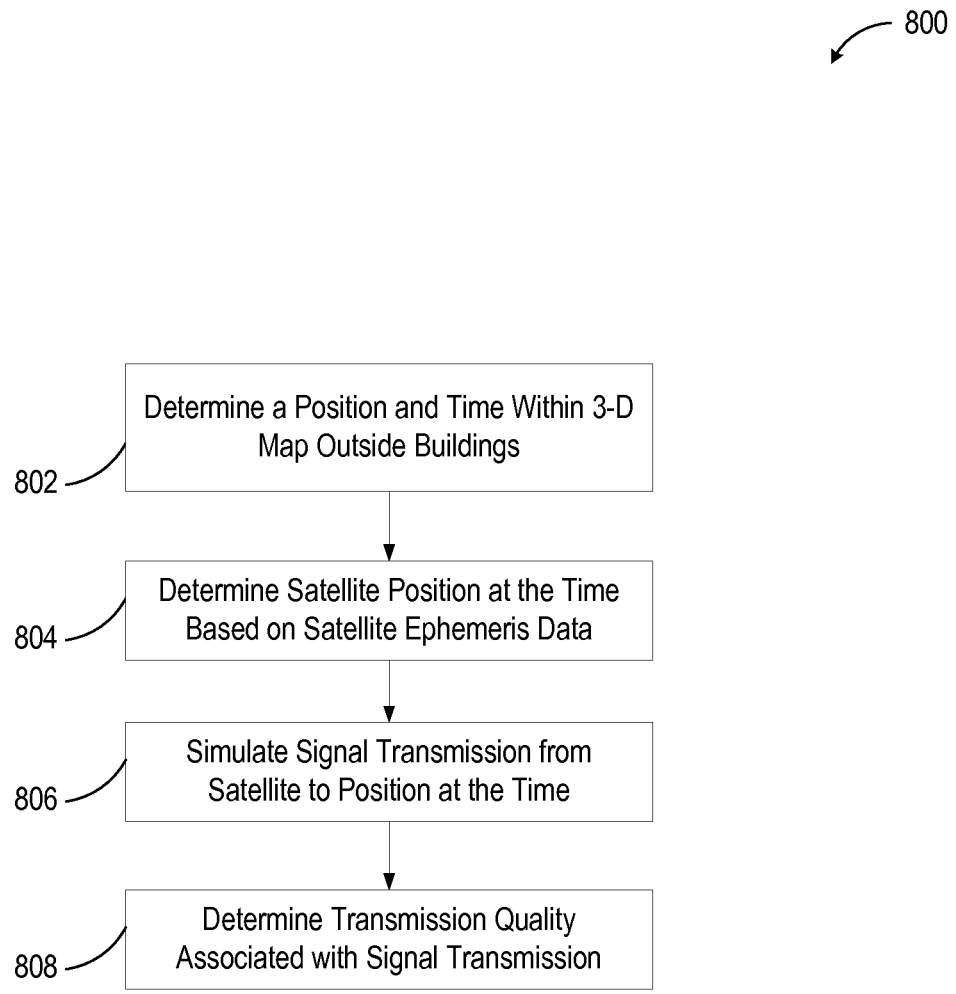
FIG. 8 is a flow chart illustrating a method for predicting transmission quality consistent with embodiments disclosed herein.
Figure 9:
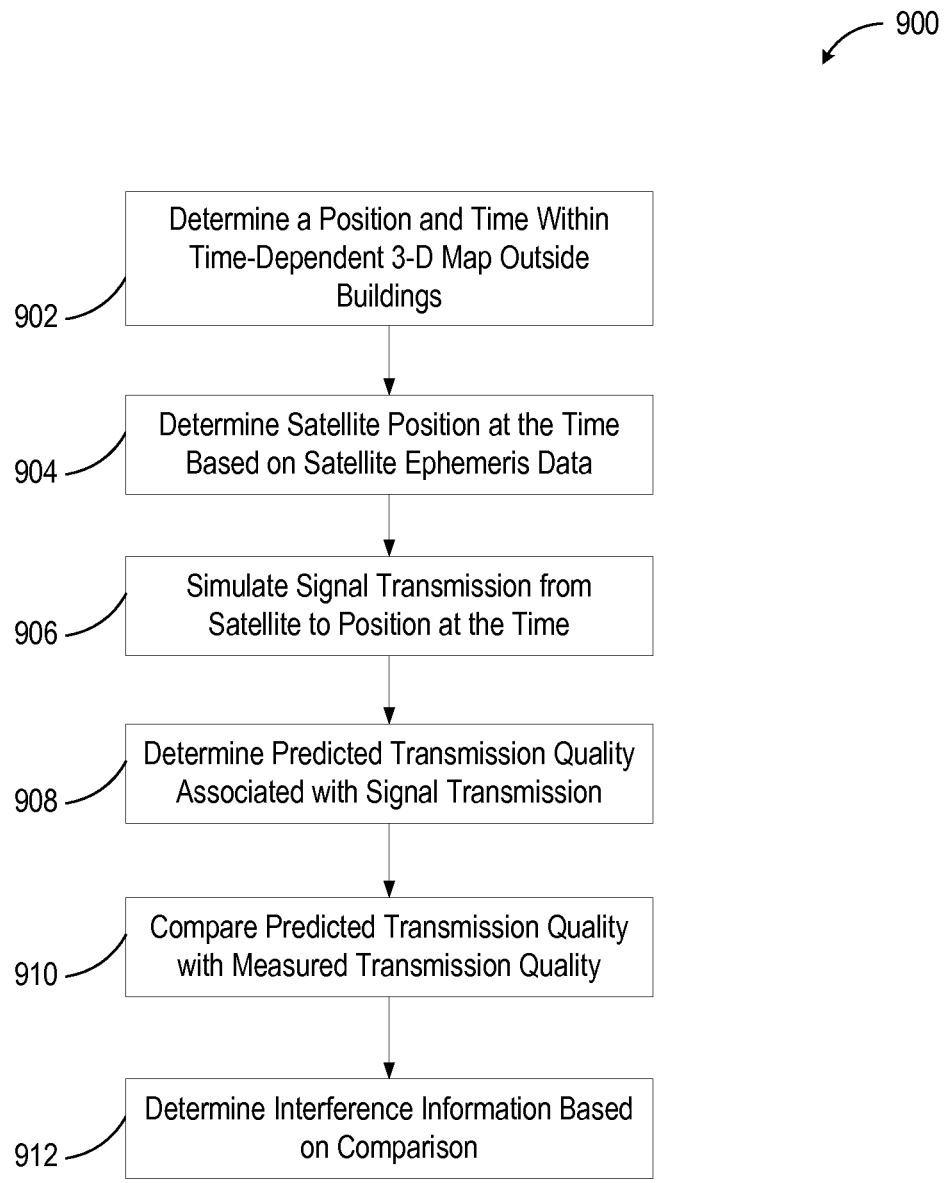
FIG. 9 is a flow chart illustrating a method for empirically reconciling blockage information consistent with embodiments disclosed herein.

FIGS. 8 and 9 describe methods that can be used to predict satellite transmission quality in an environment with buildings. In FIG. 8, a method is shown that predicts satellite transmission quality based on a three-dimensional map and satellite ephemeris data. In FIG. 9, the predicted transmission quality is compared with measured transmission quality to identify significant differences.

FIG. 8 is a flow chart illustrating a method 800 for predicting transmission quality. The process can be accomplished by a system such as shown in FIG. 5 including a plurality of navigation systems 502 and/or the network service 526. In block 802, a GNSS navigation system determines a position that is outside buildings and a time within a three-dimensional map for modelling. In block 804, the GNSS navigation system determines a satellite position at the time based at least in part on satellite ephemeris data. In block 806, the GNSS navigation system simulates a signal transmission from the satellite to a position and time using the three-dimensional map and satellite ephemeris data. In block 808, the GNSS navigation system determines a predicted transmission quality associated with the signal transmission.

FIG. 9 is a flow chart illustrating a method 900 for empirically reconciling blockage information. The process can be accomplished by a system such as shown in FIG. 5 including a plurality of navigation systems 502 and/or the network service 526. In block 902, a GNSS navigation system determines a position that is outside buildings and a time within a three-dimensional map for modeling. In block 904, the GNSS navigation system determines a satellite position at the time based at least in part on satellite ephemeris data. In block 906, the GNSS navigation system simulates a signal transmission from the satellite to a position and time using the three-dimensional map and satellite ephemeris data. In block 908, the GNSS navigation system determines a predicted transmission quality associated with the signal transmission. In block 910, the predicted transmission quality is compared with a measured transmission quality. In block 912, the GNSS navigation system determines interference information based on the comparison in block 910 (such as jamming, spoofing, unmodeled obstructions, removal of modeled obstructions, modeling of temporary obstructions, etc.).

Figure 10:
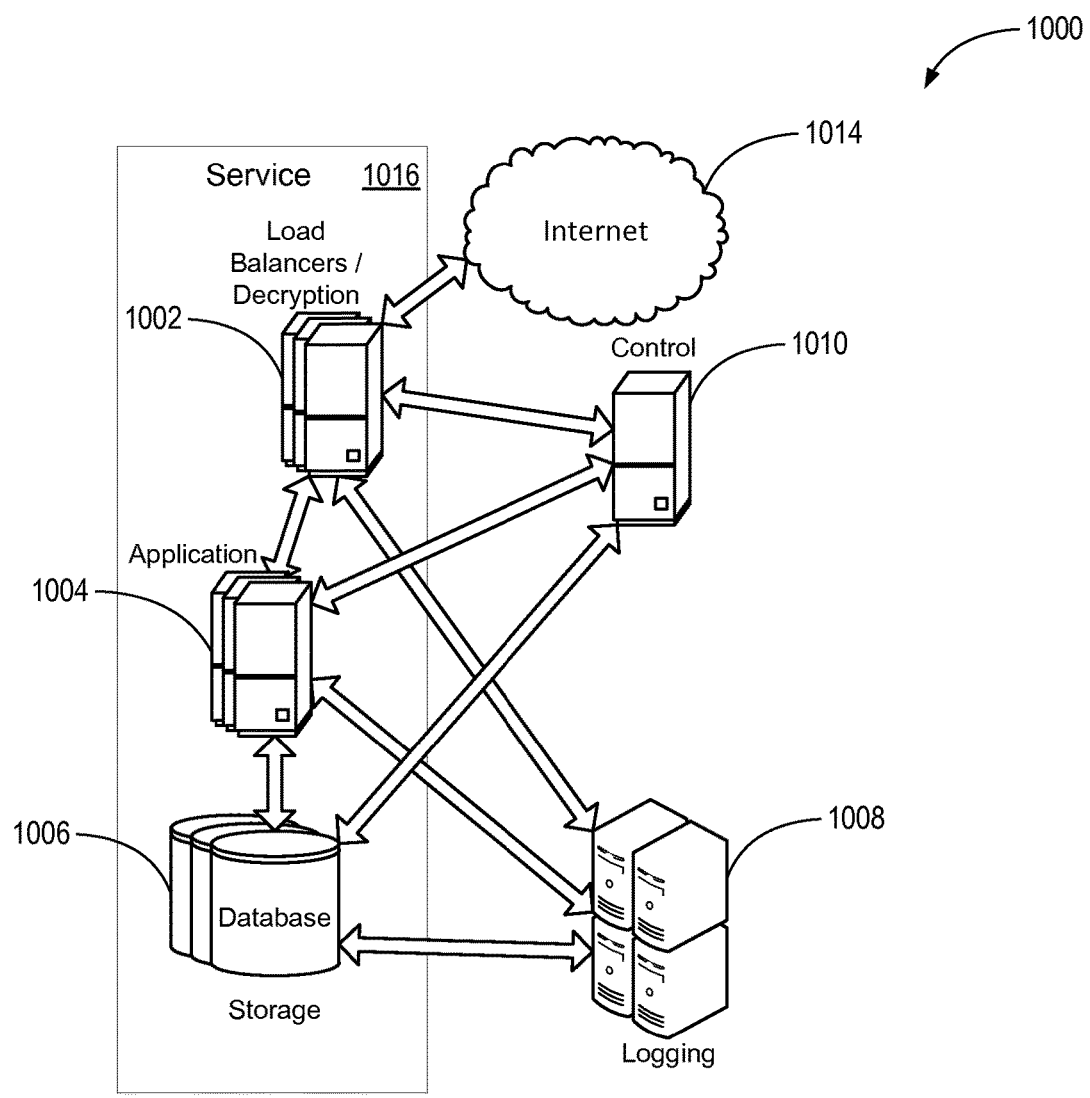
FIG. 10 is a schematic diagram of a GNSS service consistent with embodiments disclosed herein.

FIG. 10 is a system diagram illustrating a system 1000 configured to provide services to a GNSS navigation system over a network (such as an Internet 1014) consistent with embodiments disclosed herein. A GNSS navigation system can communicate with a service 1016 over the Internet 1014 as described above. The service 1016 can include load balancers 1002 capable of decryption, application servers 1004, storage 1006, control servers 1010 and/or a logging server 1008. The load balancers 1002 can receive requests from GNSS navigation systems and format the requests to be received by the application servers 1004. The application servers 1004 can receive data from the GNSS navigation systems, cause data to be stored by data servers with storage 1006 and model satellite transmissions from a satellite to a location on a three-dimensional map at a time. The application servers 1004 can provide results (such as predicted transmission quality, time dependent coverage map, etc.) to the load balancers 1002, which transmit the results to GNSS navigation systems. Database servers with storage 1006 can store data regarding the GNSS navigation system, satellite ephemeris data, routes, positions, history and/or user and/or device account information. A control server 1010 can monitor systems of the service 1016 and/or cause servers to be added to pools of servers (such as the load balancers 1002, application servers 1004 and/or database servers 1006). The control server 1010 can also provide data integrity/redundancy services such as causing snapshotting, caching and/or other features. The logging service 1008 can track usage and operations performed by the service 1016 and on behalf of the service 1016.

In one example, a user can set up an account with the service 1016 using an application on a mobile device. The user registers an account with the service 1016. The service 1016 can store user credentials in storage 1006.

Figure 11:
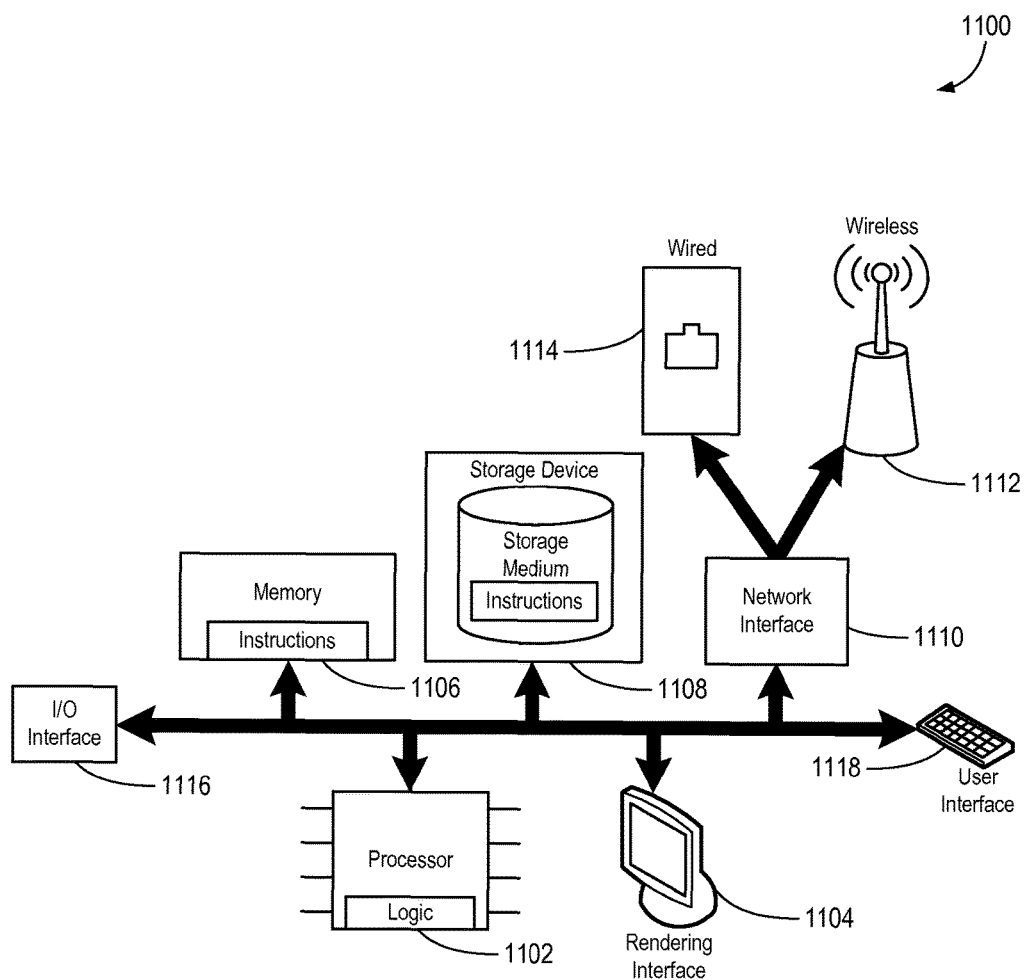
FIG. 11 is a schematic diagram of a computing system consistent with embodiments disclosed herein.

FIG. 11 is a schematic diagram of a computing system 1100 consistent with embodiments disclosed herein. The computing system 1100 can be viewed as an information passing bus that connects various components. In the embodiment shown, the computing system 1100 includes a processor having logic 1102 for processing instructions. Instructions can be stored in and/or retrieved from memory 1106 and a storage device 1108 that includes a computer-readable storage medium. Instructions and/or data can arrive from a network interface 1110 that can include wired 1114 or wireless 1112 capabilities. Instructions and/or data can also come from an I/O interface 1116 that can include such things as expansion cards, secondary buses (e.g., USB), devices, etc. A user can interact with the computing system 1100 though user interface devices 1118 and a rendering system 1104 that allows the computer to receive and provide feedback to the user.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions)

embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A device for predicting satellite visibility, comprising:
storage configured to store a three-dimensional spatial map of one or more buildings within an environment and satellite ephemeris data; and
a processor configured to:
determine a position and a time within the three-dimensional spatial map;
determine a satellite position at the time based at least in part on the satellite ephemeris data;
simulate a signal transmission from the satellite to the position at the time based at least in part on the three-dimensional spatial map; and
compute a predicted transmission quality associated with the signal transmission at the position and the time; and
compare the predicted transmission quality with a measured transmission quality from the satellite obtained by a receiver at the position and the time to determine empirically measured blockage information,
wherein the position is outside each building of the three-dimensional spatial map.

2. The device of claim 1, wherein the processor is further configured to determine one or more positions for use with a secondary navigational system based on the empirically measured blockage information.

3. The device of claim 2, wherein the secondary navigational system is assisted global positioning system.

4. The device of claim 1, further comprising a peer to peer network interface.

5. The device of claim 4, wherein the measured transmission quality is received over the peer to peer network interface.

6. The device of claim 4, wherein to compare the predicted transmission quality against the measured transmission quality further comprises:
receive, from one or more secondary devices as peers, a set of measured transmission qualities obtained from a set of positions associated with a set of times; and
infer a blockage location within the three-dimensional spatial map of the environment based at least in part on the set of measured transmission qualities.

7. The device of claim 1, further comprising a network interface.

8. The device of claim 7, wherein the measured transmission quality at the position and the time is received over the network interface from a service.

9. The device of claim 8, wherein the processor is further configured to communicate with the service through an application program interface (API) to receive the measured transmission quality.

10. The device of claim 8, wherein to compare the predicted transmission quality against the measured transmission quality further comprises:
receive, from the service, a set of measured transmission qualities obtained from a set of positions associated with a set of times; and
infer a blockage location within the three-dimensional spatial map of the environment.

11. The device of claim 10, wherein the processor is further configured to add the blockage location to the three-dimensional spatial map of the environment.

12. The device of claim 10, wherein the processor is further configured to determine the blockage location is temporary based at least in part on the set of measured transmission qualities.

13. The device of claim 1, wherein the processor is further configured to:
determine a second satellite position of a second satellite at the time based at least in part on the satellite ephemeris data;
simulate a second signal transmission from the second satellite to the position at the time based at least in part on the three-dimensional spatial map;
compute a second predicted transmission quality associated with the second signal transmission at the position and the time; and
compare the second predicted transmission quality with a second measured transmission quality from the second satellite at the position and the time to form additional empirically measured blockage information; and
update the empirically measured blockage information based at least in part on the additional empirically measured blockage information.

14. The device of claim 13, wherein the processor is further configured to determine a number of satellites from a set of satellites, the number of satellites each having a signal transmission quality at or above a quality threshold at the position and the time.

15. The device of claim 14, wherein the processor is further configured to determine whether the number of satellites is at or above a navigation threshold.

16. The device of claim 15, wherein the navigation threshold is four signal transmissions.

17. The device of claim 14, wherein the processor is further configured to transmit information associated with the number of satellites.

18. The device of claim 1, wherein the three-dimensional spatial map comprises compositional data for at least one of the buildings.

19. The device of claim 1, wherein the processor is further configured to transmit information associated with the predicted transmission quality.

20. The device of claim 19, wherein the information comprises specification of a spacetime region neighboring the position and the time for which the predicted transmission quality is at or above a specified quality threshold.

21. The device of claim 19, wherein the information comprises specification of a spacetime region neighboring the position and the time for which the predicted transmission quality is below a specified quality threshold.

22. The device of claim 1, wherein the receiver is a local receiver.

23. A method for determining global navigation satellite system (GNSS) quality comprising:
   determining a position and a time within a three-dimensional map of one or more buildings within an environment;
   determining a satellite position at the time based at least in part on satellite ephemeris data for the satellite;
   simulating a signal transmission from the satellite to the position at the time; and
   determining a predicted transmission quality associated with the signal transmission; and
   obtaining from a receiver a measurement of an actual signal quality from the satellite to the receiver at the position and time; and
   determining if the measured transmission quality is inconsistent with the predicted transmission quality at the position and time.

24. The method of claim 23, further comprising transmitting information associated with the satellite and the predicted transmission quality to a client device.

25. The method of claim 23, further comprising determining a set of predicted transmission qualities of a set of satellites in the GNSS based at least in part on the three-dimensional time map; and
   determining a predicted positional quality of the GNSS at the position and the time based at least in part on the set of predicted transmission qualities.

26. The method of claim 25, further comprising determining a spacetime location is a candidate for supplementing the GNSS with a secondary navigation system based at least in part on the set of predicted transmission qualities.

27. The method of claim 23, wherein determining that a measured transmission quality is inconsistent with the predicted transmission quality further comprises determining that a noise level of the measured transmission quality is inconsistent with the predicted transmission quality.

28. The method of claim 27, wherein determining the noise level of the measured transmission quality is inconsistent with the predicted transmission quality further comprises determining the noise level is consistent with jamming.

29. The method of claim 23, wherein determining that a measured transmission quality is inconsistent with the predicted transmission quality further comprises determining that a difference between the measured transmission quality and the predicted transmission quality is at or above a differential threshold.

30. The method of claim 29, wherein determining the difference between the measured transmission quality and the predicted transmission quality is at or above the differential threshold further comprises determining the measured signal transmission is consistent with spoofing.

31. The method of claim 23, wherein determining that a measured transmission quality is inconsistent with the predicted transmission quality further comprises determining that the measured transmission quality is lower than predicted.

32. The method of claim 31, wherein determining the measured transmission quality is lower than predicted further comprises determining the measured transmission quality is consistent with a temporary obstruction.

33. The method of claim 31, wherein determining the measured transmission quality is lower than predicted further comprises determining the measured transmission quality is consistent with an obstruction missing from the three-dimensional time map.

34. The method of claim 33, further comprising adding the obstruction to the three-dimensional time map.

35. The method of claim 23, wherein simulating the signal transmission from the satellite to the position at the time further comprises simulating transmissions from a set of satellites to one or more spacetime locations within a spacetime navigation route.

36. The method of claim 35, wherein determining the predicted transmission quality associated with the signal transmission further comprises determining a subset of satellites from the set of satellites are able to provide predicted transmission qualities that are at or above a quality threshold at a given spacetime location within the spacetime navigation route.

37. The method of claim 36, wherein determining which satellites from the set of satellites are able to provide the predicted transmission qualities that are at or above the quality threshold at the given spacetime location further comprises:
   determining a set of segments of the spacetime navigation route that are below a threshold number of satellites providing the predicted transmission qualities above the quality threshold based on the three-dimensional time map of the environment and the satellite ephemeris data; and
   predicting degraded functionality of the GNSS along the set of segments.

38. The method of claim 37, wherein predicting degraded functionality of the GNSS along the set of segments further comprises determining a predicted duration of time of degraded functionality for a segment from the set of segments.

39. The method of claim 36, wherein determining the predicted transmission quality associated with the signal transmission further comprises determining the subset of satellites is below a navigation threshold of a number of satellites.

40. The method of claim 39, wherein determining the subset of satellites is below the navigation threshold of the number of satellites further comprises determining a predicted duration of time that the navigation threshold is not met.

41. A method comprising:
   receiving from a receiver a measured transmission quality of a signal transmission of a satellite at a spacetime position;
   predicting using a computer system a predicted transmission quality from the satellite to the spacetime position based on a three-dimensional spatial map of an environment and satellite ephemeris data; and
   determining using the computer system that interference exists based at least in part on the measured transmission quality and the predicted transmission quality.

42. The method of claim 41, further comprising predicting a predicted location based services quality.

43. The method of claim 41, wherein predicting a predicted transmission quality further comprises predicting a set of predicted location based services qualities along a first route and a second route; and wherein the method further comprises computing a recommendation of the first route or the second route based at least in part on the predicted location based services qualities.

44. The method of claim 41, wherein determining the interference exists further comprises:
   determining that a set of measurements at a subset of a set of spacetime locations have a set of transmission qualities lower than indicated in associated predicted transmission qualities; and
   determining a locus of measurements that converge to indicate an unmodeled obstruction.

* * * * *